Dec. 1, 1953                    T. W. ZOBEL                    2,660,915
                        INTERFERENCE-SCHLIEREN APPARATUS
Filed July 25, 1950                                          3 Sheets-Sheet 1
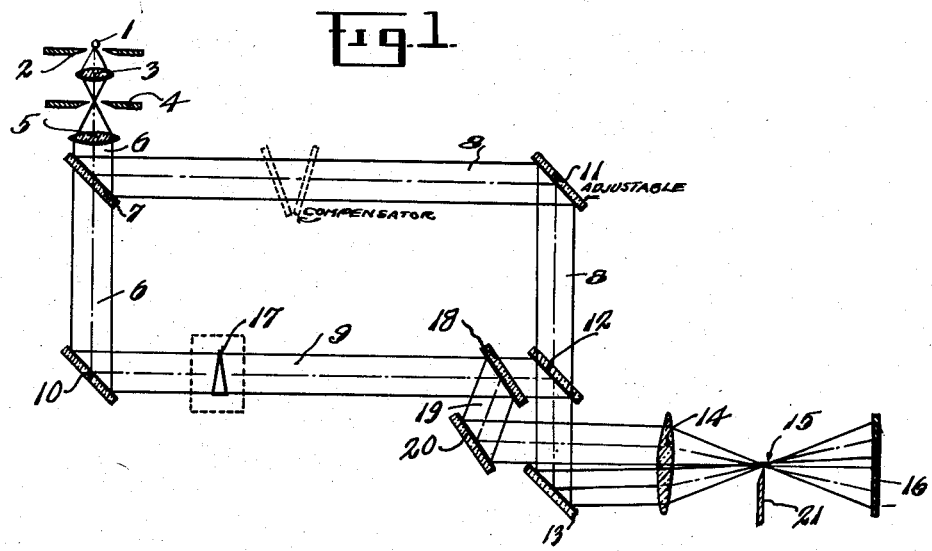
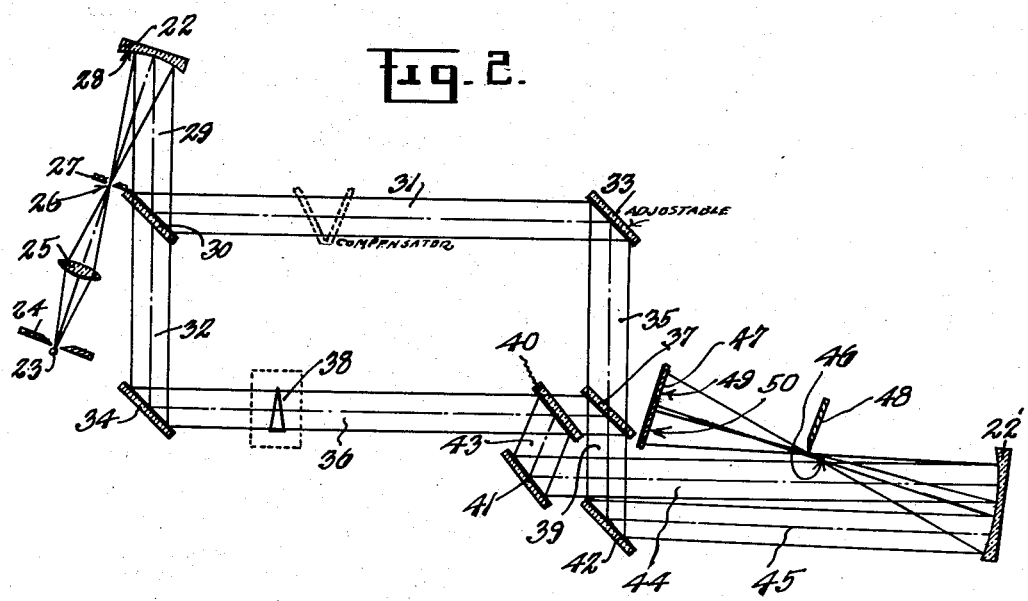
INVENTOR.
THEODOR W. ZOBEL
BY
ATTORNEYS Dec. 1, 1953
T. W. ZOBEL
2,660,915
INTERFERENCE-SCHLIEREN APPARATUS
Filed July 25, 1950
3 Sheets-Sheet 2
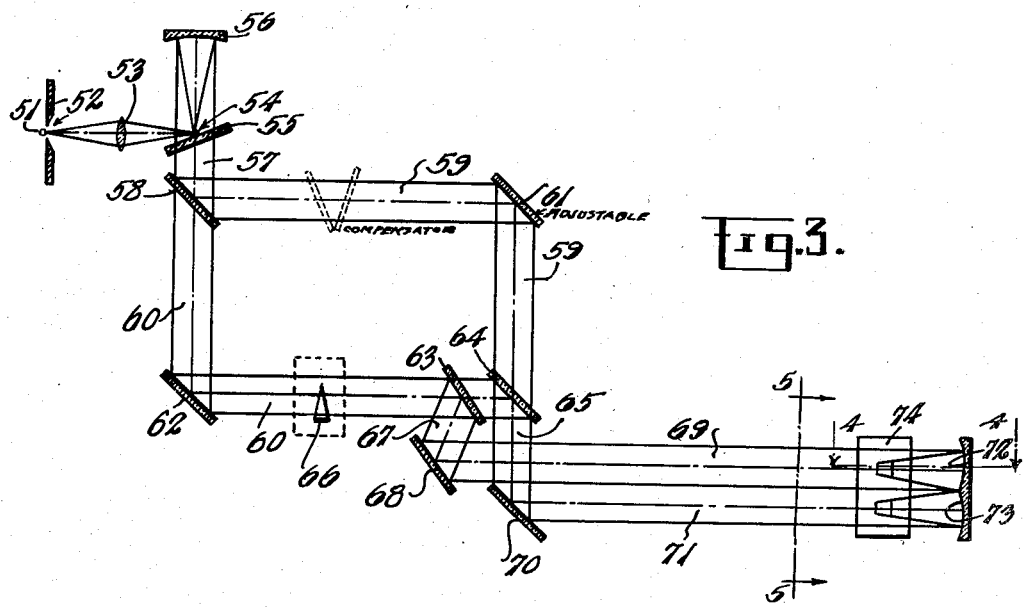
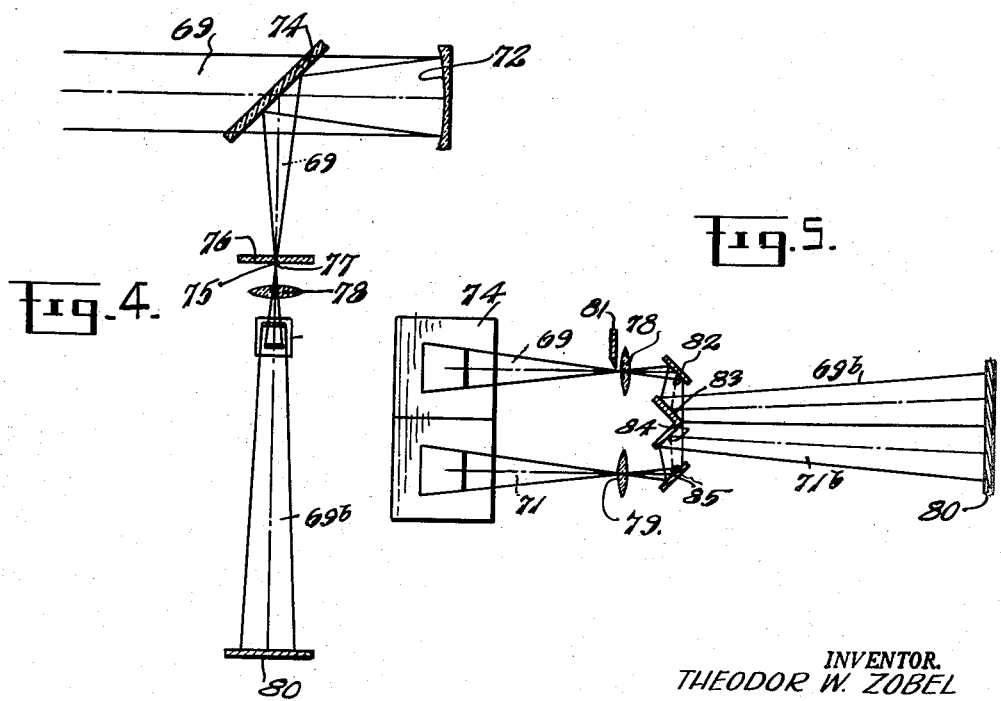
INVENTOR.
THEODOR W. ZOBEL
BY
ATTORNEYS

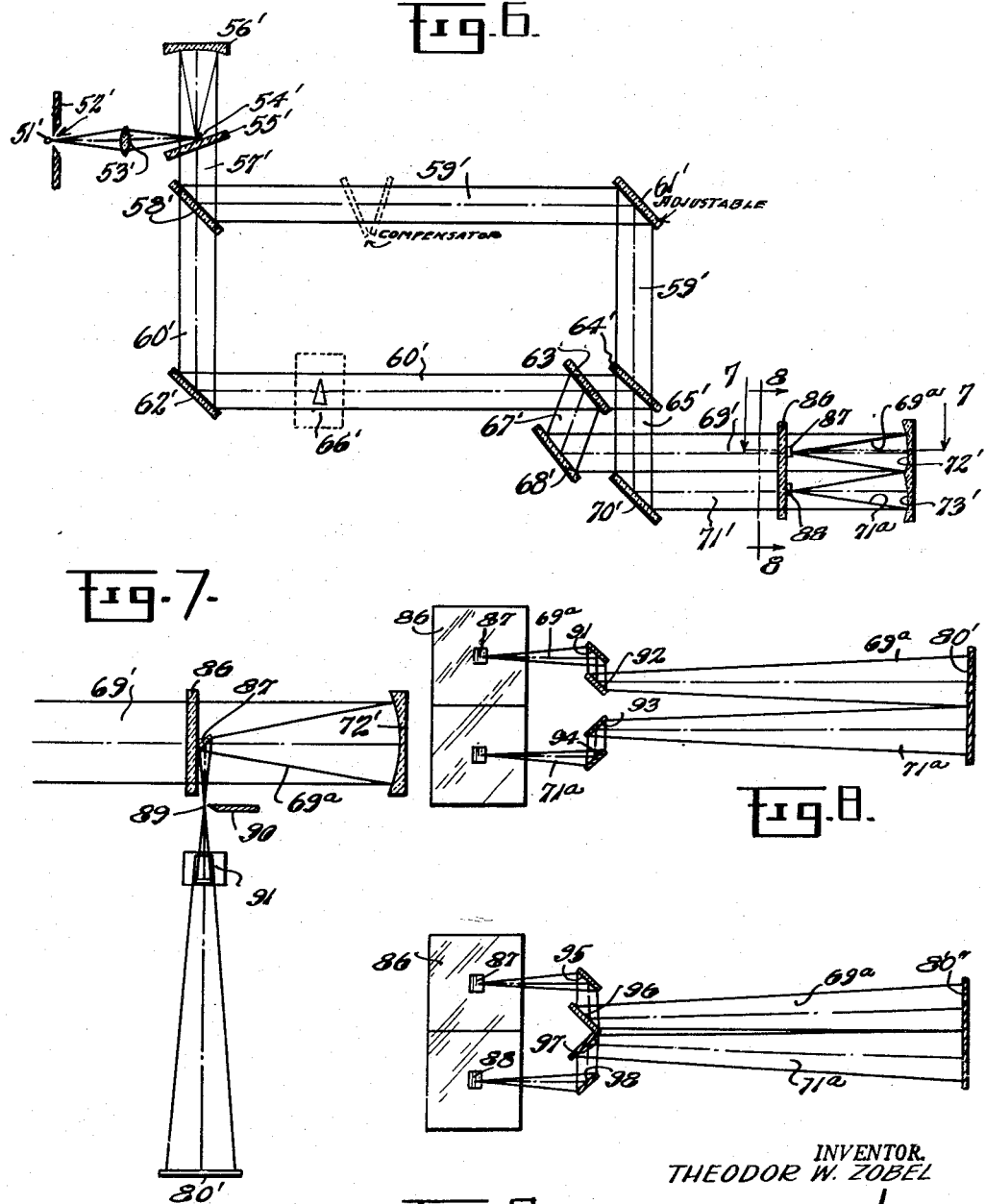

Patented Dec. 1, 1953

2,660,915

UNITED STATES PATENT OFFICE 2,660,915

INTERFERENCE-SCHLIEREN APPARATUS

Theodor W. Zobel, Braunschweig, Germany

Application July 25, 1950, Serial No. 175,844

3 Claims. (Cl. 88—14)

(Granted under Title 35, U. S. Code (1952), sec. 266)

The invention described herein may be manufactured and used by or for the Government for governmental purposes without payment to me of any royalty thereon.

This invention relates to optical arrangements and methods for examining the density of materials and test mediums in a qualitative and quantitative respect such as disclosed in my U. S. Patent No. 2,256,855 filed 7 November 1939 and patented on 23 September 1941.

It is expedient in that patent to examine the medium to be tested with two light rays traveling in the same direction. Fundamentally it is possible with the Schlieren light ray, to examine the medium to be tested in a ray traveling in the opposite direction, or in exceptional case, at some other angle. In all cases, supplementary to known advantages, where the Schlieren light ray penetrates the medium to be tested in another direction from the interference ray, a separate light source is normally necessary. The Schlieren ray must be superimposed on the interference ray by means of a partially coated medium and in the same manner separated from it. This process increases the light loss considerably, and other disadvantages relative to the filtering out process of the superimposed Schlieren light ray are present.

In the subject invention it is possible to use a single light source, dispense with filters and filtering out processes, the interference light ray being used in the interference fringe method and in the Schlieren method. By this method the light ray travels divided through a four plate system unfiltered, but before one of the divided light rays reaches the fourth plate, a portion of the ray is reflected or branched off for use in the Schlieren method.

In the former arrangements in my patent, above referred to, the distance from the medium 17 to be tested through the coated (partially silvered) reflector plate 18 to the screen 16 is not the same as the distance through the interference plate 12, making it necessary to provide lenses or concave mirrors having different focal lengths when the object under investigation is to be projected on the screen shown in the patent is to be the same relative size for both pictures.

According to the present invention, an inherent simplification of the processes is reached because both light ray paths are at the same optical distance from the object of the test, so that where comparative pictures of interference fringes and Schlieren images are projected in side-by-side relation on the image screen they are of the same relative size making it necessary to use only one lens, or concave mirror for both light beams with the Schlieren knife edge located in the focal plane of that lens or concave mirror. Both light beams may be inclined relative to each other to produce two separate light concentrations in the focal plane of lens 14 with the Schlieren knife engaging only the Schlieren beam.

Another example from the physics of air flow may be noted: With the flowing of an air stream around a model in a test medium, such as the wings of an aircraft in the subsonic and supersonic ranges, it is frequently necessary to install the Schlieren knife edge with the edge approximately parallel to the axis of the model, making boundary layers and shock waves on the image screen bright at the upper half of the model, and dark on the opposite or lower side of the model, blending together at the contour of the image of the model. The image is, however, falsified on one side and the true profile section of the model can only be recognized on one side.

In the present invention this disadvantage is avoided by an improved dark field arrangement. Instead of a Schlieren knife edge I may utilize a very small opaque plate, inserting the same in the concentrated light from the source in the focal plane, the small plate being supported by a transparent plate in order to eliminate any disturbances caused by the process of mounting, permitting the light ray to be refracted out in any direction as soon as the density change takes place in the tested medium. The direction of the density change now is not effected as in the case with the Schlieren knife edge stop member which means that heat as well as coolness yields only brightness on the image screen. This advantage makes the method appear to cause the image on the image screen lift itself away as a darkened silhouette, from bright surroundings on the screen.

Other objects and advantages of the invention will become apparent from the following description, taken in connection with the accompanying drawings in which like reference characters refer to like parts in the several figures.

Figure 1 is a schematic view of an arrangement incorporating my invention and utilizing lenses;

Figure 2 is a modified arrangement utilizing the Z shaped arrangement of the light inlet and exit portions of the apparatus, utilizing concave reflectors instead of lenses;

Figure 3 illustrates a further modification of my apparatus, utilizing a symmetrical arrangement for the concave reflectors and optical system;

Figure 4 is a top view of the portion of the apparatus below the level 4—4 looking in the direction of the arrows, parts shown in section;

Figure 5 is a vertical sectional view taken about on the plane indicated by line 5—5 of Figure 3;

Figure 6 illustrates a further modified embodiment in which the light entrance arrangement is similar to Figure 3, but the light exit arrangement is modified to eliminate the use of the solid lens means shown in Figures 3 and 4;

Figure 7 is a horizontal schematic view taken about on the line 7—7 of Figure 6 looking in the direction of the arrows; and Figure 8 is a vertical sectional view taken about on the line 8—8 of Figure 6, looking in the direction of the arrows, and Figure 9 is a view similar to Figure 8 in which the adjacent side of the Schlieren and interference beams are substantially parallel.

Reference numeral 1 in Figure 1 indicates a source of concentrated light disposed in the rear of a light slit or elongated light aperture 2 with a lens system 3 having a second light aperture 4 for the converging beam of light to pass therethrough to a collimating lens 5 for projecting a collimated beam of light 6 onto a partially silvered beam splitting mirror 7, 30% silvered on the side facing the light source to pass about seventy percent of the light therethrough and reflect thirty percent. The mirror 7 is preferably inclined across the collimated light beam 6 at an angle of 45 degrees and constitutes a light beam splitting means.

Two flat opaque mirrors are inclined, one across the collimated beam 6 and the other across reflected beam 8, these mirrors being indicated in Figure 1 by the reference numerals 10 and 11 constitute reflecting means for reflecting the two partial light beams 6 and 8 toward each other again. The reflected portion of the thirty percent collimated light beam 8 and the portion of the seventy percent light beam 9 reflected by mirror 10 extend in parallel paths.

A semi-transparent beam splitting plate 12 is inclined across both of the divided light beams 8 and 9 at their point of intersection, this semi-transparent plate having a coating capable of passing fifty per cent of the beam 8 therethrough and reflecting fifty percent of the beam 9 in the same direction as the axis of the beam 8 before the passage of the beam 9 through the semi-transparent reflector 12.

A full mirror 13 is inclined across the beam 8 after its passage through the beam combining reflector 12 reflecting the beam 8 in almost but not quite parallel relation to the beam 9 after the beam 9 leaves the opaque mirror 10. The divided light beams 8 and 9 are thereby recombined and pass as a light interference beam through either a large condensing lens or two separated lenses 14 having a focal plane at 15, and are projected on a recording or image screen 16. This arrangement just described forms a four-plate interferometer system somewhat similar to that disclosed in my patent No. 2,256,855 (to Theodor Zobel), issued September 23, 1941. The test medium is interposed in the partial light beam 9, as indicated at 17. Some compensating means must be provided in the partial beam 8 to compensate for the transparent walls of the test chamber containing the test medium.

A semi-transparent flat mirror 18 is inclined across the partial light beam 9 between the test medium 17 and the semi-transparent mirror 12 for reflecting a portion of the test beam 9 laterally, for use in Schlieren method. This last reflected or Schlieren beam, indicated at 19, strikes an opaque or full mirror 20 disposed in parallel relation to the mirror 18 reflecting the Schlieren beam through the condensing lens 14 in adjacent almost parallel relation to the recombined beam; after the reflection thereof by the opaque mirror 13. The condensing lens 14 converges the Schlieren beam 19 and the recombined interference beam through two close together focal points in the focal plane 15, the two beams then diverging from their focal points are projected onto the dual image receiving or recording screen 16 in close side-by-side relation, providing two side-by-side images of the test medium of similar proportions, one image being a Schlieren image and the other being the interference image. The Schlieren knife edge or stop member 21 disposed to engage the converging Schlieren beam in the focal plane 15, provides the necessary means for darkening of the image field to produce the Schlieren image.

The above described system and apparatus provides an inherent simplification of the apparatus since both light paths are synchronized at the same distance from the test medium 17, both interference beams passing through the common lens means 14 or two separate close together lenses which converges them through two focal points 15 produces a pair of side-by-side images on the image screen 16. Both pictures produced are identical in size, and juxtaposed relative to each other, and therefore comparison can be easily and satisfactorily made by observations, or a recordation is possible when a sensitized surface is provided at the image screen.

The arrangement shown in Figure 1 has the advantage of producing clear cut optical representations and since the light source is in the optical axis and the geometrics of the ray is symmetrical no distortion or astigmatism is possible, providing a lens of good optical quality is used and has sufficient diameter to include the two parallel interference light beams.

Referring to Figure 2, a pair of concave optical reflectors or mirrors 22, 22' are used, arranged to provide Z shape light inlet and light outlet means for the combined dual light ray interference system shown in this figure. These concave reflectors have their optical axes inclined so as to have their axes offset relative to the main collimated beam passing through the optical arrangement and the final dual interference beams. The reference numeral 23 indicates a concentrated light source preferably of monochromatic light having an optical slit or aperture 24 adjacent the light source 23 as shown in Figure 2. A conventional good quality lens 25 gathers the light passing through the light slit aperture 24 and concentrates the same through the light concentration 26 with a light aperture 27 located at the focal point of the concave reflector 22. The reflecting surface of the concave reflector 22 preferably is parabolic, indicated at 28, reflecting collimated light beam 29 onto the adjacent reflecting surface of a semi-transparent beam splitting mirror 30, "silvered" to reflect substantially 30% of the collimated beam 29 and passing substantially 70% therethrough, forming respectively two diverging partial beams of collimated light indicated at 31 and 32. Full mirrors 33 and 34 are inclined respectively across the collimated beams 31 and 32 and are disposed in almost parallel relation to the beam splitting mirror 30. The two opaque reflectors 33 and 34 reflect the two partial light beams 31—32 across each other in intersecting relation to form the respective beams 35 and 36, a semi-transparent beam splitting plate 37 being inclined across the beams 35 and 36 at their point of intersection, having a semi-silvered reflecting surface facing the mirror 34, for passing substantially 50% of the beam 35 therethrough and reflecting substantially 50% of the beam 36 in coincident relation to the beam 35, forming a beam recombining mirror for combining the two portions of the intersecting collimated beams 35—36. A test medium 38 to be inspected is interposed in the beam 36 to produce light interference phenomena in the recombined beam 39.

A beam splitting plate or semi-transparent mirror 40 is inclined across the beam 36 which contains the test medium 38, having 50% reflecting surface for reflecting substantially 50% of the test beam 36 laterally so that the portion reaching the beam splitting mirror 37 is substantially 35% rather than 70%. Opaque flat mirrors 41 and 42 are inclined across the path of the emerging beam 43, reflected by the beam splitting mirror 40, and across the path of the emerging beam 39, for reflecting these beams substantially but not quite in parallel relation, indicated at 44 and 45, onto the concave reflecting surface of the mirror 22' in side-by-side relation. This mirror 22' is preferably formed with a parabolic curvature which concentrates the two beams through two light concentrations within the focal plane 46 onto an image screen 47.

A Schlieren knife edge or stop member 48 engages the converging reflected Schlieren beam at its focal point 46. Two side-by-side pictures are produced on the common image screen 47 at the portions indicated at 49 and 50 on the image screen. By utilizing a 30%–70% partial transparent reflecting surface on the beam splitting plate 30 and 50% partial transparent reflectors as indicated at 37 and 40 the illumination of the two interference beams reaching the screen 47 is substantially equal. As mentioned before, the images are disposed side-by-side, have similar sizes, so that the comparison of the light wave interference patterns formed thereby is easily and satisfactorily made.

Figure 3 illustrates a slightly different arrangement, although the four-plate inteferometer arrangement as shown is substantially similar to that shown in Figures 1 and 2. Means are provided in this modification for utilizing a symmetrical optical system, providing a short focus concave mirror instead of the solid lens in Figure 1 or the long focus mirror in Figure 2 so that the illumination can be materially increased over that shown in Figure 2, and the light loss and other objections inherent with large thick solid lenses are not present in the arrangement about to be described. The substitution of the concave mirrors having short focal lengths, particularly at the light entrance, for the lenses employed in Figure 1 affords increased illumination and greater covering power. In Figure 3 a concentrated source of monochromatic light is indicated at 51, a light slit or aperture at 52, and a small lens 53 for concentrating the light passing through the light aperture 52 on an inclined mirror 54 of small dimension just sufficient to surround the concentrated beam and is supported by a transparent plate 55. The focal point of the beam striking the small mirror plate 54 is located at the focal point of the concave reflector 56 and the beam is reflected by the concave mirror 56 as a collimated beam 57.

A beam splitting partially transparent plate 58 is inclined across the beam 57, said mirror 58 having a partially transparent 30% reflecting surface for reflecting substantially 30% of the beam 57, indicated at 59, and passing substantially 70% of the beam 57 therethrough, indicated at 60, forming the two diverging partial light beams of collimated light, indicated at 59 and 60. Opaque reflector plates or full mirrors 61, 62 are inclined across the beams 59 and 60 and disposed parallel to the beam splitting plate 58, reflecting the two beams 59 and 60 across each other in intersecting relation. A semi-transparent beam splitting plate 63 is inclined across the reflected beam 60, reflecting substantially 50% of the beam 60 laterally for use in forming the Schlieren beam 67. A semi-transparent beam splitting recombining plate 64 is inclined across the intersecting remaining portion of the beam 60 and the beam 59 at their point of intersection, producing the recombined interference beam 65.

A test medium 66 is interposed in the beam 60, preferably between the opaque mirror 62 and semi-transparent beam splitting plate 63. The portion of the beam 60 which is reflected by the semi-transparent mirror 63 is indicated at 67, this beam being again reflected by an opaque mirror 68. A second opaque reflector plate or mirror 70 is inclined across the combined interference beam 65 for reflecting the same in adjacent parallel relation to the Schlieren beam 69, this reflected beam being indicated at 71. A pair of concave reflectors with parabolic reflecting surfaces 72 and 73 are provided, positioned in the respective beams 69 and 71 for reflecting and converging the beams 69 and 71 on their axes onto an inclined semi-transparent reflector plate 74, reflecting the two converging beams 69 and 71 laterally out of the Schlieren and interference beams and through the respective focal points 75 of the concave mirrors 72 and 73, best seen in Figure 4. A transparent supporting plate 76 is positioned across the two converging interference beams adjacent their respective focal points 75, the plate 76 having one small opaque spot or obstruction at the center of the Schlieren beam 69 slightly smaller than the diameters of the reflected converging beam 69 to produce the Schlieren picture on the image screen 80. Lenses 78 and 79 are disposed in the two beams 69 and 71 substantially at the focal points and an aforesaid Schlieren knife or stop member 81 may be disposed to engage the edge of the Schlieren beam 69. Spaced parallel reflector plates 82, 83 and 84, 85 are disposed in the respective beams 69b and 71b between the lenses 78, 79, and the image plane or screen 80, the reflectors 82 and 85 comprising means for locating the adjacent edges of the two pictures in juxtaposed relation on the screen 80. This part of the arrangement is best shown in Figure 5.

In Figures 6, 7 and 8 of the drawings a four-plate interferometer system is shown which is somewhat similar to the arrangement illustrated in Figure 3, except that the light exit arrangement of the apparatus is different. For this reason the same reference numerals are used as in Figure 3 to indicate similar or identical parts, with the exception that these reference numerals are each primed. For instance, the light source in Figure 3 is indicated at 51 and the collimating reflector at 56, while in Figure 6 the similar light source is indicated at 51' and the collimating reflector at 56'. The light exit portion of the apparatus shown in Figure 6 is slightly modified, comprising a transparent supporting plate 86 which is disposed across both of the interference beams 69' and 71', this plate being positioned slightly beyond the focal point of the two concave reflecting surfaces 72' and 73'. Small opaque reflectors 87 and 88 supported by the plate 86 are inclined across the converging portions 69a and 71a of the respective beams 69' and 71', just inside of the focal points for reflecting the converging beams laterally through their respective focal points. The little mirror 87 can be used simultaneously as the Schlieren knife edge to produce the Schlieren effect on screen 86'. Another arrangement is possible by making the mirrors 87 and 88 a little larger and moving the same slightly closer to the concave mirrors 72 and 73. Then the knife edge 90 is disposed to engage the Schlieren beam 69a at its focal point 89 outside of the parallel beam 69'.

Figure 8 discloses the exit portion comprising a pair of inclined parallel opaque reflectors 91, 92 positioned in the beam 69a between the focal point 89 of the screen 86', together with a second pair of parallel opaque reflector plates 93 and 94 disposed in the beam 71a, so as to project the Schlieren beam 69a and the interference beam 71a with their axes parallel and their adjacent edges adjacent to each other at the image viewing or recording screen 86'.

Figure 9 discloses a slightly different arrangement of the parallel opaque mirrors, providing means for positioning the adjacent sides of the two diverging interference beams 69a and 71a in juxtaposed parallel relation substantially throughout their entire length. The inclined parallel mirrors in the beam 69a are indicated at 95, 96 and those in beam 71a are 97, 98.

In the device as shown in all of the figures of the drawings a single light source is used, the beam is split or divided, as in the usual four-plate interferometer arrangement, and then recombined, to form the light interference beam containing fringes, one of the divided beams, comprising the test beam passing through the testing medium while the other passes outside of the test medium provides the variation in light density between the two beams to produce the light wave interference phenomena. The test beam is split to provide a third beam before reaching the semi-transparent recombining plate for causing the Schlieren picture. Both of these beams are then projected in parallel side-by-side relation onto the single viewing or recording screen 86, 86' or 86'' to produce side-by-side Schlieren and interference fringe pictures. By utilizing a reflecting surface having a 30% semi-transparent coating on the first splitting plate 58, the splitting plate 63 for the Schlieren picture divides the intensity of the illumination in the test beam before it reaches the recombining plate 64 so that the illumination of the Schlieren image and the illumination of the interference fringe images are substantially equal.

Another advantage is the utilization of a single light source for producing both the Schlieren and the interference fringe images, together with means for keeping the images uniform in size, as well as uniformly and equally illuminated.

What I claim is:

1. In an optical arrangement for the investigation of light density field of a test medium, first and second comparative test means for exploring the density fields, a single light source for both of said test means having a light aperture, means for collimating the light passing through the aperture into an enlarged collimated light beam, said first test means including a 30 per cent silvered flat mirror inclined across the collimated light beam for reflecting approximately 30 per cent of the light beam and passing therethrough about 70 per cent of the light beam, to form two diverging collimated partial light beams, a pair of flat opaque full mirrors, one inclined across each of the partial light beams to reflect the diverging light beams toward each other, to form two spaced rectangular light paths of substantially equal length, said 70 per cent partial light beam adapted to traverse a test medium, a recombining semi-transparent flat mirror inclined across the 30 per cent partial light beam at the intersecting axes of the two partial light beams, said semi-transparent mirror having a semi-transparent reflecting surface for reflecting substantially 50 per cent of the 70 per cent partial light beam passing the test medium and striking the recombining mirror in a coincident direction to 50 per cent of the 30 per cent partial light beam passing through the last mentioned semi-transparent reflecting surface to reunite the last mentioned two partial light beams to form a single light interference beam, a flat opaque mirror inclined across the interference light beam for reflecting the interference light beam laterally in a predetermined direction, said second comparative test means including a third mirror having a semi-transparent flat reflecting surface inclined across the path of the partial light beam traversing the test medium and located between the test medium and the semi-transparent recombining mirror for reflecting approximately 50 per cent of the partial light beam traversing the test medium in a lateral, almost but not quite, parallel direction diverging relative to the reflected portion of the interference beam to form a Schlieren beam, a flat opaque full mirror inclined across the path of the said laterally reflected Schlieren beam for reflecting the Schlieren light beam in almost but not quite parallel spaced side-by-side relation to the interference beam and in the same direction, single focusing means disposed in the path of both of the last mentioned reflected parallel light beams at equal optical distances from the test medium for converging the beams through two juxtaposed points in the focal plane of the single focusing means to form a pair of side-by-side interference and Schlieren images of identical size on the image plane of the single focusing means, and a Schlieren stop member positioned to engage the Schlieren light beam in said focal plane to form a darkened light field for the Schlieren image in said image plane.

2. Apparatus as claimed in claim 1 in which the focusing means for converging the two partial light beams through said two juxtaposed points comprises a single concave reflector having the two said points located on a plane passing through its focal point and includes an image screen located in the image plane of the last mentioned concave reflector for receiving the light images of the first and second comparative test means in juxtaposed side-by-side relation.

3. Apparatus as claimed in claim 1 in which said single focusing means for converging said two partial light beams through said two juxtaposed points in its focal plane comprises a single lens receiving both of said reflected interference and Schlieren beams therethrough, and an image screen in the image plane of said single lens for receiving the interference and Schlieren images thereon in side-by-side relation.

THEODOR W. ZOBEL.

References Cited in the file of this patent

UNITED STATES PATENTS

| Number | Name | Date |
|---|---|---|
| 1,938,992 | Baker et al. | Dec. 12, 1933 |
| 2,256,855 | Zobel | Sept. 23, 1941 |
| 2,398,139 | Freeman | Apr. 9, 1946 |
| 2,570,219 | Drake | Oct. 9, 1951 |

FOREIGN PATENTS

| Number | Country | Date |
|---|---|---|
| 720,333 | Germany | May 1, 1942 |